United States Patent [19]

Anderson et al.

[11] 4,015,520
[45] Apr. 5, 1977

[54] STACK-FORMING MACHINE HAVING TILTING PRESS

[76] Inventors: John Dale Anderson; Bruce Leo Lutz, both of Box 788, Hesston, Kans. 67062

[22] Filed: June 6, 1975

[21] Appl. No.: 584,468

[52] U.S. Cl. .................................. 100/215; 56/344; 100/245; 100/270

[51] Int. Cl.² ............................................ B30B 1/08

[58] Field of Search ............................ 56/344–361; 100/245, 271, 270, 215, 233; 214/9

[56] References Cited

UNITED STATES PATENTS

| | | | |
|---|---|---|---|
| 3,404,622 | 10/1968 | Flanagan | 100/233 |
| 3,691,741 | 9/1972 | White | 56/344 |
| 3,703,966 | 11/1972 | Jones | 100/233 |
| 3,757,687 | 9/1973 | Brooks | 100/270 |
| 3,871,163 | 3/1975 | Kanengieter | 56/344 |
| 3,886,719 | 6/1975 | Garrison | 56/344 |

*Primary Examiner*—Billy J. Wilhite

[57] ABSTRACT

A stack-forming machine is provided with press reciprocating mechanism which tilts said press during reciprocation of the latter from a substantially horizontal position at or near the lower limit of press travel to a canted position at the upper limit of press travel wherein the front of the press adjacent the crop loader is above the rear of the press. A first embodiment of the invention utilizes interconnected two-bar linkages, one of which has a lost motion connection between its links; a second embodiment utilizes interconnected parallel and skewed four-bar linkages to tilt the press; while yet a third embodiment utilizes two-bar linkages of unequal length to accomplish press tilting.

11 Claims, 4 Drawing Figures

STACK-FORMING MACHINE HAVING TILTING PRESS

This invention relates to improvements in a stack-forming machine of the type, for example, shown in U.S. Pat. No. 3,556,327, issued to Garrison, on Jan. 19, 1971, and entitled "Loose Hay Wagon;" U.S. Pat. No. 3,732,672, issued to Adee et al. on May 15, 1973 and entitled "Stack Forming Loader;" and U.S. Pat. No. 3,691,741, issued to White et al. on Sept. 19, 1972, and entitled "Machine for Loading, Stacking and Unloading Crops."

It is an important object of our invention to provide a stack-forming machine having press-actuating mechanism capable of tilting the press in such a manner while vertically reciprocating the latter that improved crop compaction is accomplished in the area of the stack adjacent the crop loader.

Another important object of the present invention is to provide a stack-forming machine having press-actuating mechanism for maintaining the crop loading end of the press above the other end when the press is at its upper limit of vertical travel.

Other important objects include accomplishing press tilting during actuation through interconnected two-bar linkages provided with a lost motion connection in one linkage, through interconnected skewed and parallel four-bar linkages, or through interconnected two-bar linkages wherein one linkage is shorter than the other.

Figure 1:
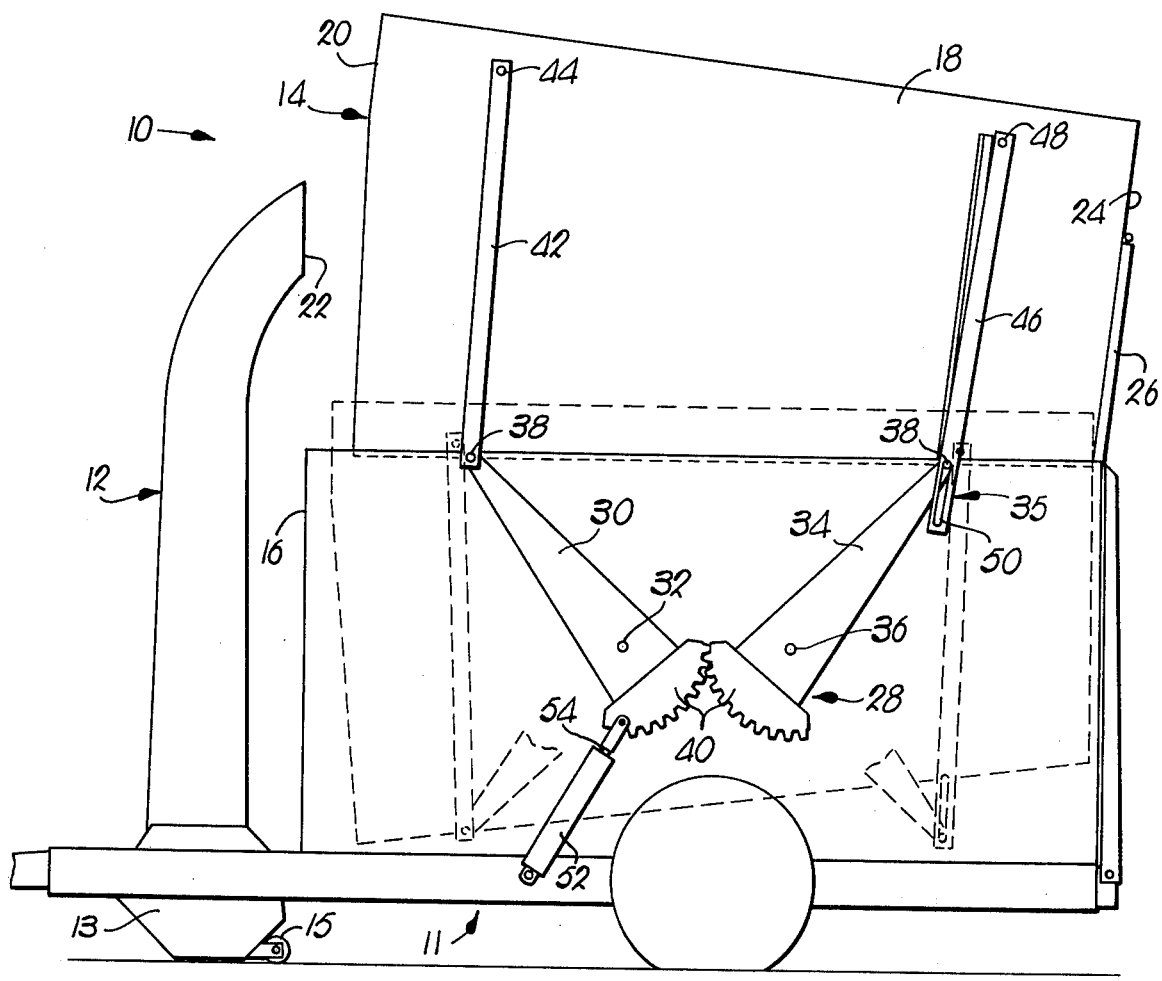
FIG. 1 is a side elevational view of a stack-forming machine in accordance with the present invention, the lowered position of the press being indicated by dashed lines.
Figure 2:
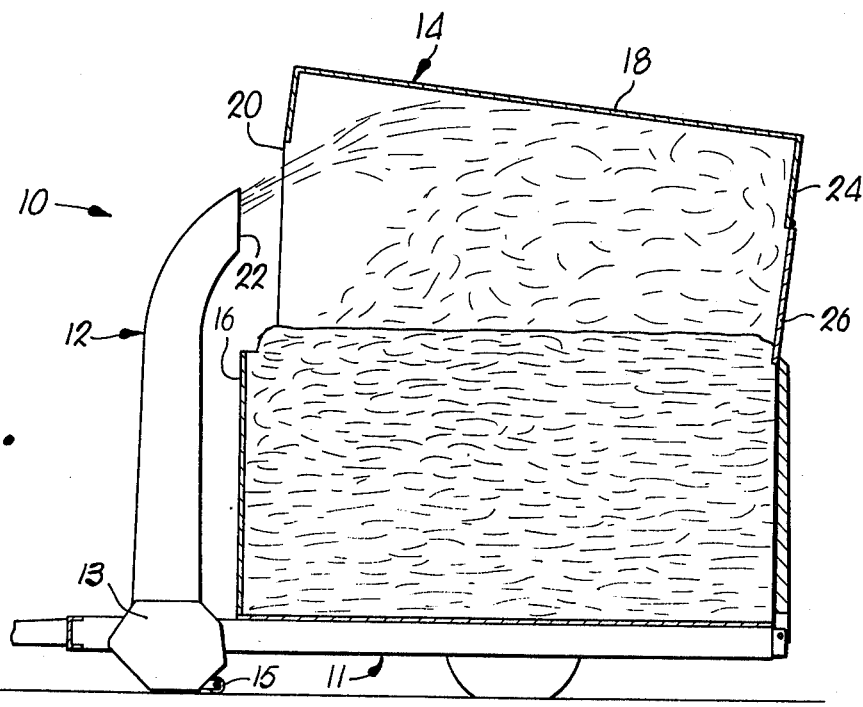
FIG. 2 is a longitudinal vertical cross-sectional view of the stack-forming machine illustrating crop buildup.

Referring to FIG. 1, a stack-forming machine generally designated by the numeral 10 has a hollow container 14 carried by a wheeled chassis 11. Container 14 comprises a rectangular open top body 16 and a transversely arched, vertically reciprocable press 18 adapted to be telescopically received within body 16. Access to the inside of container 14 is provided through an open front end 20 in press 18 and an opposed, open rear end 24. Rear end 24 is normally covered by a tailgate 26 pivotally suspended from press 18.

An elongated, upright crop loader 12 is mounted on chassis 11 forwardly of said container and includes a lower ground-engaging end 13 supported at least in part by a gauge wheel 15, flail-type crop pickup mechanism (not shown), and an upper, rearwardly directed discharge end 22 adjacent the front end 20 of press 18.

Press 18 is vertically reciprocated by a press-actuating mechanism 28 mounted on each side of machine 10 between the body 16 and the press 18 (one only being shown). Each mechanism 28 includes a front lever 30 mounted on body 16 for swinging movement about a shaft 32 and a rear lever 34 similarly mounted on body 16 for swinging movement about a shaft 36. Levers 30, 34 are identical in construction, each lever being generally triangular, having a laterally extending pin 38 positioned near the narrow end thereof, and having an arcuate gear section 40 on the wide end thereof. Gear sections 40 are intermeshed for synchronizing movement of levers 30, 34 in opposite directions.

Each mechanism 28 additionally includes an elongate, forward link 42 pivotally mounted on press 18 near end 20 by a pin 44 and an elongate rear link 46 pivotally mounted on press 18 near end 24 by a pin 48. Link 42 is swingably coupled to lever 30 by pin 38, while rear link 46 is operably coupled with lever 34 by a lost motion connection 35 formed by pin 38 captivated within an elongated slot 50 in link 46. Each mechanism 28 is actuated by a hydraulic cylinder 52 secured at one end to body 16, the cylinder 52 including a piston rod 54 connected to the gear section 40 of lever 30. As clearly shown each mechanism takes the form of interconnected two-bar linkages, the rear of which has a lost motion connection 35 between its two links (lever 34 and link 46).

A motion guide 31 (shown only in FIGS. 3 and 4) on each side of container 14 comprises an elongate channel member 33 uprightly mounted on press 18 and a guide pin 37 rigidly mounted on body 16 extending inwardly into the channel of member 33. Guide 31 restricts longitudinal movement of press 18 relative to body 16 and thereby provides a pivot point about which press 18 may be tilted.

In operation, the stack-forming machine 10 is drawn along a crop windrow by a draft vehicle. Crop material is picked up by loader 12 and projected rearwardly from outlet 22 into container 16 through end 20 of press 18. Periodically, loading is halted and press 18 is reciprocated by mechanism 28 to compact the crop.

Cylinder 52 reciprocates press 18 between the upper press position shown in solid lines in FIG. 1, and a lower press position shown in broken lines in the same Figure. In the lower position the press is generally level or horizontal, with pin 38 of lever 34 being at the lowermost end of slot 50. When rod 54 is contracted to raise press 18 to the position shown in solid lines in FIG. 1, the press 18 becomes canted, having the end 20 somewhat above end 24, with the pin 38 of lever 34 being at the upper end of slot 50. It will be apparent that the canted orientation of press 18 is caused by lost motion in connection 35 as pin 38 slides within slot 50 from the lower end to the upper end of the latter when the press is raised toward its upper limit of travel.

Figure 3:
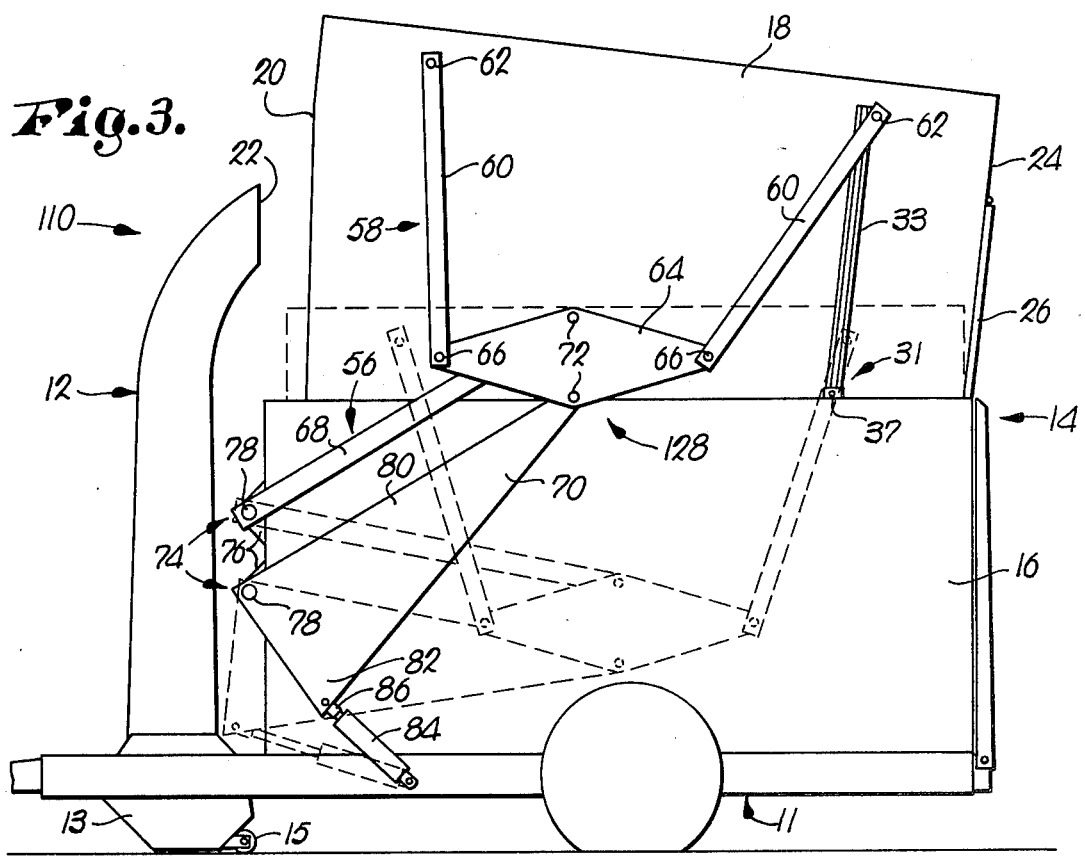
FIG. 3 is a side elevational view of a second embodiment of the present invention.

In the second embodiment shown in FIG. 3, the main components of the stack-forming machine 110 are substantially the same as those of the first embodiment. The press actuation in the second embodiment is accomplished by a motion transmitting mechanism 128 on each side of machine 110 which interconnects press 18 with body 16. The mechanism 128 includes a pair of four-bar linkages 56 and 58 interconnected by a common link in the form of a diamond-shaped pivot plate 64.

Four-bar linkage 58 is a skewed linkage that includes a portion of the press 18, a pair of spaced elongate links 60 mounted respectively at one end on press 18 for swinging movement about spaced pins 62, and the pivot plate 64 interconnecting links 60 at the ends opposite pins 62 for swinging movement about spaced pins 66. Links 60 are skewed by virtue of the spacing between pins 62 being greater than the spacing between pins 66.

Four-bar linkage 56 is a parallel linkage comprising an elongate member 68 in spaced, parallel relationship to one side 80 of an elongate, triangular member 70; plate 64 interconnecting respectively one end of members 68 and 70 for swinging movement about pins 72; and a pair of structures 74 coupling respectively the opposite ends of members 68 and 70 to body 16. Each structure 74 includes a triangular plate 76 having one side rigidly attached to body 16 and a shaft 78 extending from plate 76 to provide a pivotal connection with members 68 and 70.

Elongate member 70 has a corner 82 opposite side 80 interconnected to body 16 by a hydraulic cylinder 84 for actuation of mechanism 128. A ram 86 of the cylinder 84 is operably connected to corner 82 such that contraction of ram 86 raises press 18 to the position shown in solid lines in FIG. 3, and extension of ram 86 lowers press 18 to the position shown in broken lines in FIG. 3.

The operation of machine 110 is substantially the same as the operation of the first embodiment. The only significant operating difference in the two embodiments is the operation of the motion transmitting means 128.

When cylinder 84 is actuated to reciprocate press 18 along a vertical path of travel, mechanism 128 functions to tilt the press 18. As ram 86 is contracted from an extended position, plate 64 is continuously held in the same angular orientation relative to body 16 by parallel linkage 56. However, skewed linkage 58 causes the angular orientation of plate 64 relative to press 18 to deviate; since plate 64 is held in a fixed orientation by linkage 56, the angular change between press 18 and plate 64, imparted by linkage 58, is manifested in a tilting of press 18 rather than a tilting of plate 64. Consequently, the press 18 will be canted from an original horizontal position at its lower path of travel to a rearwardly and downwardly inclined position at its upper limit of travel. Analagous to mechanism 28 in the first embodiment, mechanism 28 operated to raise end 20 of press 18 to an elevation above end 24 as well as to move end 20 through a greater path of travel than end 24.

Figure 4:
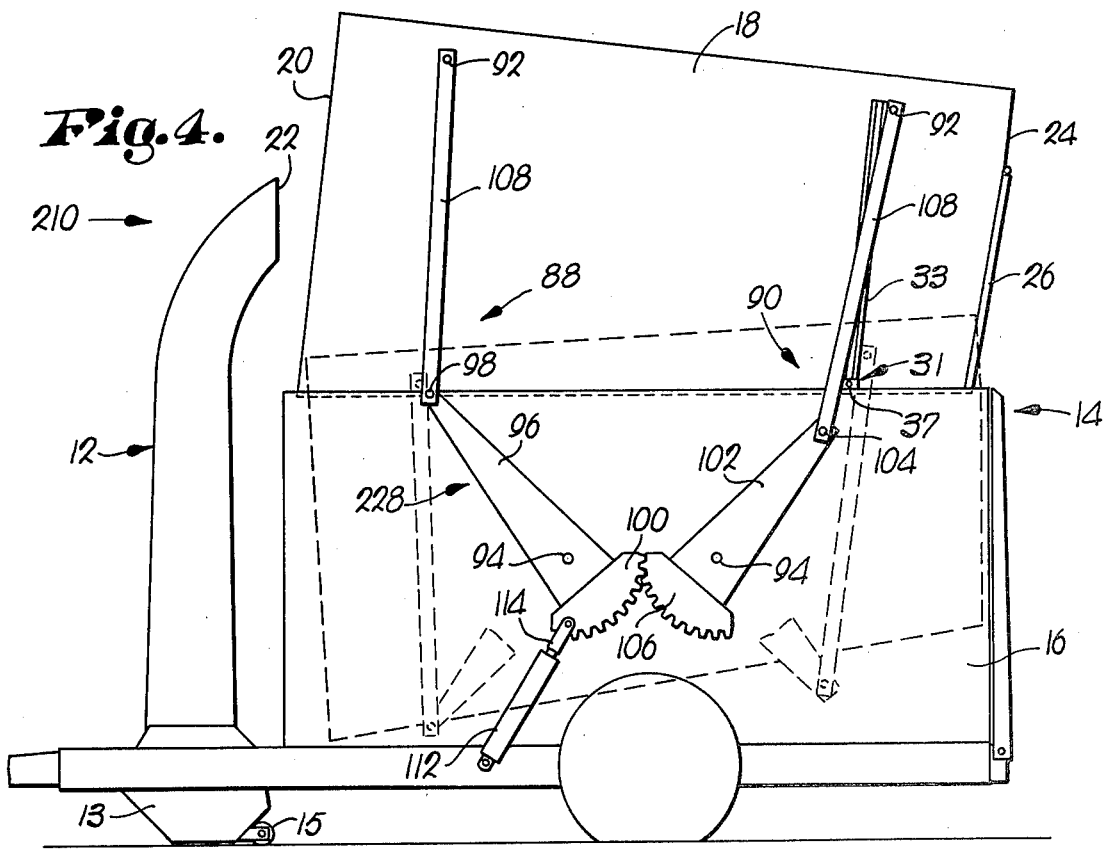
FIG. 4 is a side elevational view of yet a third embodiment of the present invention.

A third embodiment, as shown in FIG. 4, comprises a stack-forming machine 210 having a motion transmitting mechanism 228 operably intercoupling press 18 and body 16 for vertical reciprocation of the press 18 relative to the body 16. The major components of the third embodiment are the same as the machine 10 of the first embodiment.

The mechanism 228 comprises a pair of two-bar linkages 88 and 90, each linkage being swingably mounted at one end to press 18 by pins 92 and being mounted near the opposite end on shafts 94 which extend outwardly from body 16. Linkage 88 comprises an elongate, triangular lever 96 having a pin 98 mounted on the narrow end thereof, and an arcuate gear section 100 at the wide end of the lever 96. Linkage 90 includes an elongate, triangular lever 102, relatively shorter than lever 96, having a pin 104 extending from the narrow end thereof, and an arcuate gear section 106 at the wide end of lever 102. Gear section 100 and 106 are intermeshed for synchronous movement of levers 96 and 102 in opposite directions. A pair of elongate links 108, extending respectively between pins 92 on press 18 and pins 98, 104 on levers 96, 102, intercouple levers 96, 102 with press 18.

A cylinder 112 is connected to body 16 at one end thereof and is coupled to gear section 100 by a ram 114. Actuation of cylinder 112 reciprocates press 18 between a rearwardly inclined, upper position shown in solid lines in FIG. 4, and a forwardly inclined, lower position shown in broken lines in FIG. 4.

The operation of the major components of the third embodiment is substantially similar to the operation of the components in the first embodiment in that the crop is directed by the loader 12 through open end 20 into body 16. Press 18 is periodically reciprocated from an upper position to a lower, compacting position as material is collected in body 16. Mechanism 228 functions not only to reciprocate press 18 vertically, but to tilt the same during reciprocation thereof. The tilting movement results from the length differential between the linkages 88 and 90 caused by lever 102 being shorter than lever 96. It will be apparent that the shorter linkage 90 moves end 24 through an abbreviated vertical path of travel relative to the path of travel imparted to end 20 by longer linkage 88.

Many crop stacks produced by previous machines having presses which did not tilt had a tendency to sag at their front ends after the stacks were weathered in the field for a certain period of time. While the stacks were initially well-shaped and symmetrical, eventually the front of the stacks tended to settle more than the rear, causing the top of the stacks to slope downwardly and forwardly. This not only gave the stacks an unsightly appearance, but also contributed to problems in maintaining the overall quality of the crop material as a livestock feed. In this regard, water is ideally shed from the stacks transversely thereof along the arcuate top of the stacks, but when the stacks are forwardly and downwardly sloped, the water runs along the fore and aft length of the top, giving it greater opportunity to soak into the stack and thereby spoil the interior material. Further, uneven settling tends to open fissures which permit moisture to readily enter the stacks instead of being properly shed.

The uneven settling problem arises for two major reasons. First, remembering that the crop is loaded into the front of the container and it is the front of the stack that settles more than the rear, it is extremely difficult to load as much crop material into the front of the container as into the back. The material is projected from the crop pickup with substantial velocity, and therefore has a natural tendency to travel as far to the rear of the container as permitted, bypassing the front portion thereof. Further, in this regard, since there must be an opening in the front of the container through which the material is loaded, the material at the front cannot build up beyond the level of such opening or else the material will begin escaping through the opening.

Secondly, the normal stack-forming procedure calls for building up the accumulated crop to the rear of the container before attempts are made to distribute the material in the front and middle of the container in such a way as to weave the material into a cohesive stack. This means that the material at the rear has longer to compact under its own weight than that at the front, and therefore the rear of the stack may contain more densely compacted material, less subject to settling than the front. Moreover, since the rear of the container is loaded first, that material is subjected to a greater and longer amount of shaking and jostling as the container moves over a field, such movement having a tendency to in itself add to the compaction of the crop.

The present invention overcomes the above-mentioned problems by raising the loader end of the press above the unloading end to allow relatively more material to be directed into the area of the press adjacent the loader than remote from the loader. Consequently, the stacks formed by the machine have more material in the area of the stack associated with the loader. This, of course, reduces the likelihood of voids being formed in this area of the stack.

Additionally, the press actuating mechanism of the present invention moves the loader end of the press through a greater path of travel than the unloader end. The larger path of travel at the loader end serves to increase the amount of compaction imparted to the crop by this end of the press such that the portion of the stack adjacent the loader can now be compacted to a density at least as high as remaining portions of the stack.

Having thus described the invention, what is claimed as new and desired to be secured by Letters Patent is:

1. A stack-forming machine including:
   a container having a crop-receiving body and a vertically reciprocable press for compacting the crop in the body,
   said press having a length and width substantially the same as the interior of said body;
   a loader for feeding crops into the container; and
   press-actuating mechanism for reciprocating said press along a substantially vertical, rectilinear path of travel to compact all of the crop in the body simultaneously,
   said mechanism being operable to tilt the press during reciprocation of the latter.

2. The stack-forming machine as claimed in claim 1, wherein said loader is disposed adjacent one end of the press, said one end being above the opposite end of the press when the latter is at the upper limit of its path of travel.

3. The stack-forming machine as claimed in claim 2, wherein the path of travel of said one end of the press is greater than the path of travel of said opposite end.

4. The stack-forming machine as claimed in claim 1, wherein said mechanism includes a pair of levers on the body, operably intercoupled for swinging movement in unison, and a link joining each lever respectively with the press, one of said links having a lost motion connection at one end thereof.

5. The stack-forming machine as claimed in claim 4, wherein said lost motion connection is between said one link and its lever.

6. The stack-forming machine as claimed in claim 4, wherein said loader is adjacent one end of said press, said one link being adjacent the opposite end of the pressfor moving said opposite end through a shorter path of travel than said one end.

7. The stack-forming machine as claimed in claim 1, wherein said mechanism includes:
   a pair of interconnected four-bar linkages operably coupling the body with said press,
   one bar being common to both linkages,
   one of said linkages being parallel and the other of said linkages being skewed.

8. The stack-forming machine as claimed in claim 7, wherein said one linkage includes a portion of said body and said other linkage includes a portion of said press.

9. The stack-forming machine as claimed in claim 7, wherein said loader is adjacent one end of said press, said mechanism being operable to move said one end through a path of travel greater than said opposite end.

10. The stack-forming machine as claimed in claim 1, wherein said mechanism includes:
    a pair of linkages interconnecting said body with the press; and
    means operably intercoupling said linkages for movement in unison,
    one of said linkages being longer than the other.

11. The stack-forming machine as claimed in claim 10, wherein said loader is adjacent one end of said press, said one linkage being adjacent said one end for moving the latter through a path of travel greater than said opposite end.

* * * * *